(12) United States Patent
Nakayama

(10) Patent No.: US 7,676,098 B2
(45) Date of Patent: Mar. 9, 2010

(54) INFORMATION PROCESSING APPARATUS, SYSTEM AND METHOD FOR COMPRESSION OF IMAGE DATA

(75) Inventor: Toru Nakayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

(21) Appl. No.: 11/420,409

(22) Filed: May 25, 2006

(65) Prior Publication Data

US 2006/0268164 A1 Nov. 30, 2006

(30) Foreign Application Priority Data

May 31, 2005 (JP) ............................. 2005-159122
Apr. 25, 2006 (JP) ............................. 2006-120803

(51) Int. Cl.
G06K 9/36 (2006.01)
H04N 11/02 (2006.01)
G06K 9/46 (2006.01)

(52) U.S. Cl. .................................. 382/232; 348/384.1

(58) Field of Classification Search ................ 382/232, 382/233, 239, 243; 358/1.14–1.16, 426.13, 358/474, 539; 375/240.12, E7.129; 348/384.1, 348/564, 600; 345/555, 635; 703/23; 714/728, 714/733

See application file for complete search history.

(56) References Cited

U.S. PATENT DOCUMENTS

| 4,802,114 | A | * | 1/1989 | Sogame | 703/23 |
|---|---|---|---|---|---|
| 4,992,782 | A | * | 2/1991 | Sakamoto et al. | 345/555 |
| 6,100,931 | A | * | 8/2000 | Mihara | 375/240.12 |
| 6,169,820 | B1 | * | 1/2001 | Wade et al. | 382/239 |
| 6,859,562 | B2 | * | 2/2005 | Ueki | 382/246 |
| 6,950,974 | B1 | * | 9/2005 | Wohl et al. | 714/733 |
| 7,209,266 | B2 | * | 4/2007 | Tabata et al. | 358/474 |
| 2002/0051203 | A1 | | 5/2002 | Kizaki | |
| 2002/0126308 | A1 | * | 9/2002 | Uetsuki et al. | 358/1.14 |
| 2003/0193691 | A1 | * | 10/2003 | Tanaka et al. | 358/1.16 |
| 2006/0268164 | A1 | * | 11/2006 | Nakayama | 348/384.1 |
| 2006/0274366 | A1 | * | 12/2006 | Nakayama | 358/1.15 |

FOREIGN PATENT DOCUMENTS

| CN | 1325057 A | 12/2001 |
|---|---|---|
| JP | 10-109433 A | 4/1998 |
| JP | 2003-134345 A | 5/2003 |

OTHER PUBLICATIONS

Bin Xue, Common Compression-method in Image Format-RLE Compression-method Family (I), Dec. 30, 1995.

* cited by examiner

*Primary Examiner*—Amir Alavi
(74) *Attorney, Agent, or Firm*—Canon U.S.A. Inc., I.P. Division

(57) ABSTRACT

To reduce the amount of data transferred from an electronic apparatus to other electronic apparatus, a first compression unit compresses image data in units of m bits with a predetermined pattern to produce first compression data. A second compression unit compresses the first compression data in units of k bits to produce second compression data. And, an output unit outputs the second compression data according to a production order of the second compression data produced from the second compression unit.

9 Claims, 10 Drawing Sheets

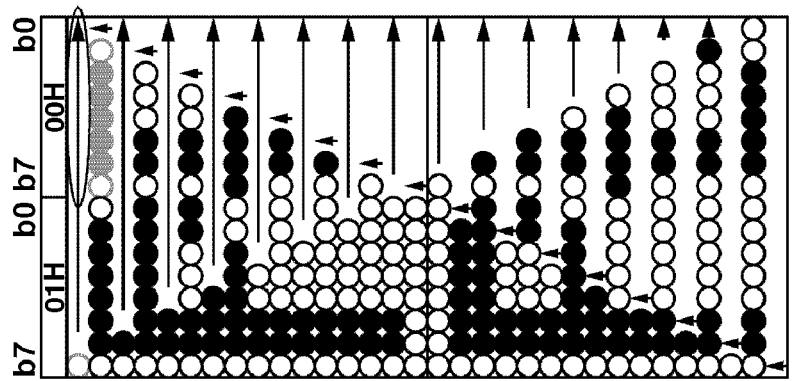
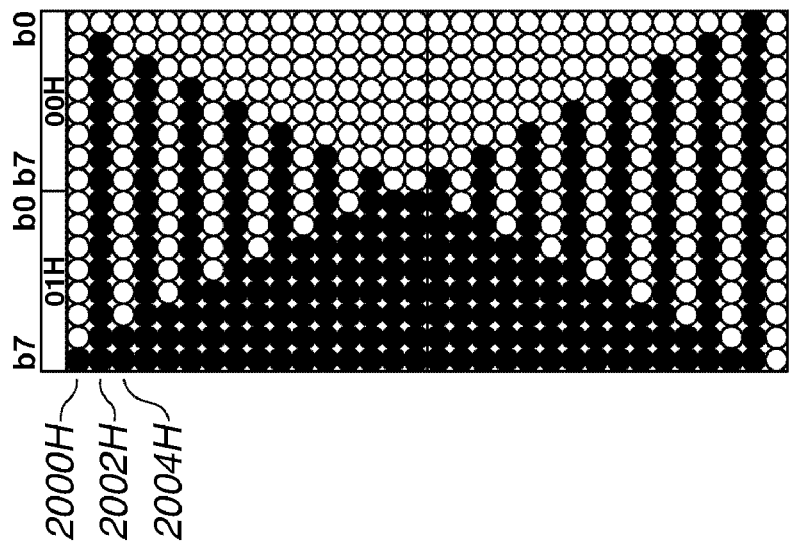
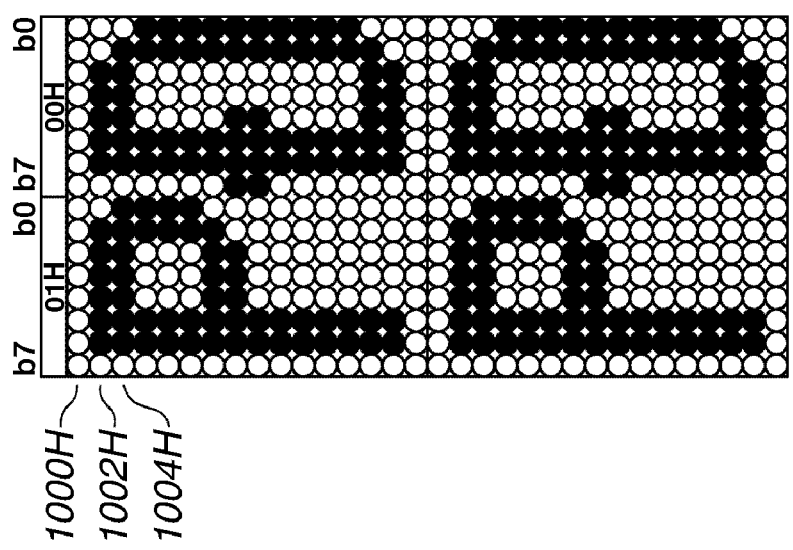

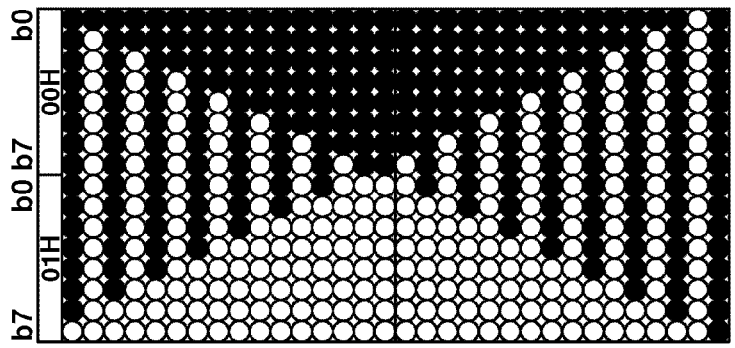
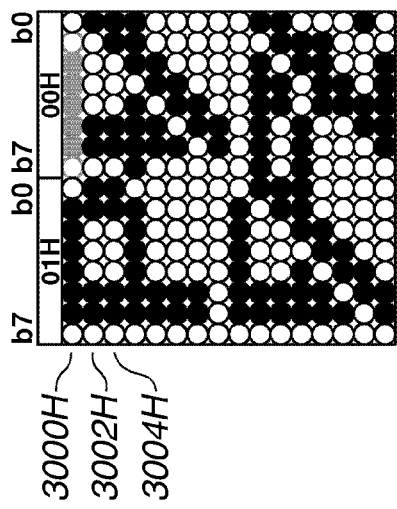

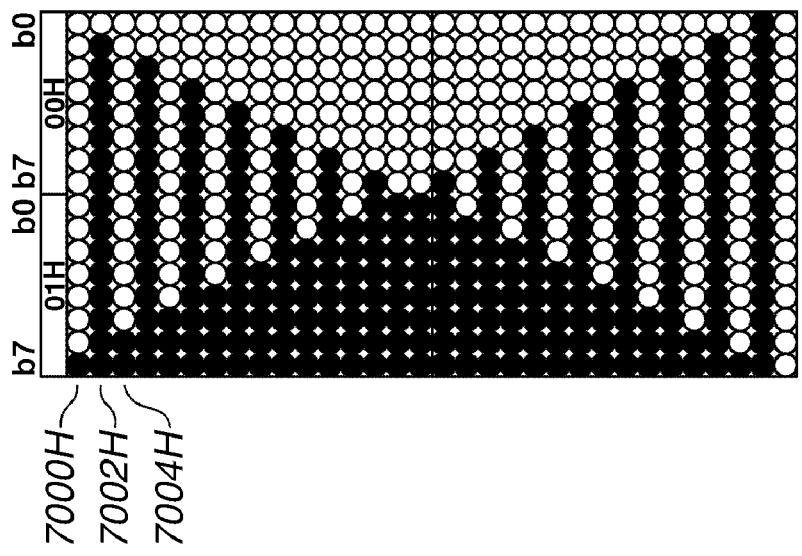

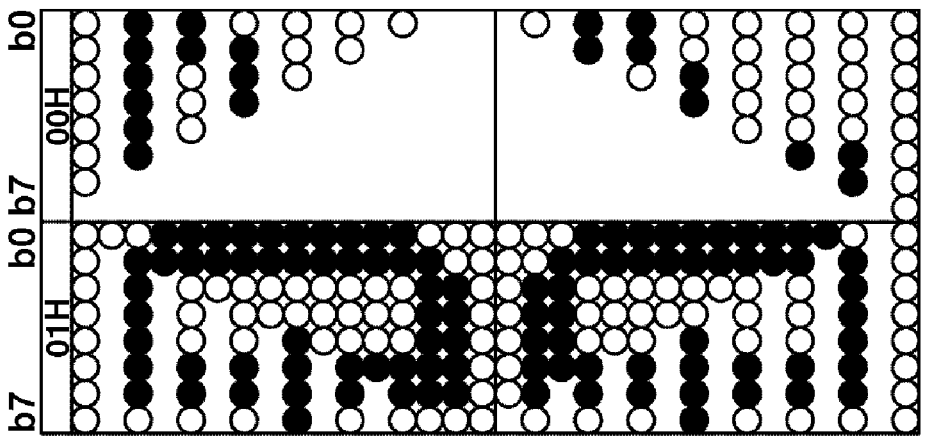
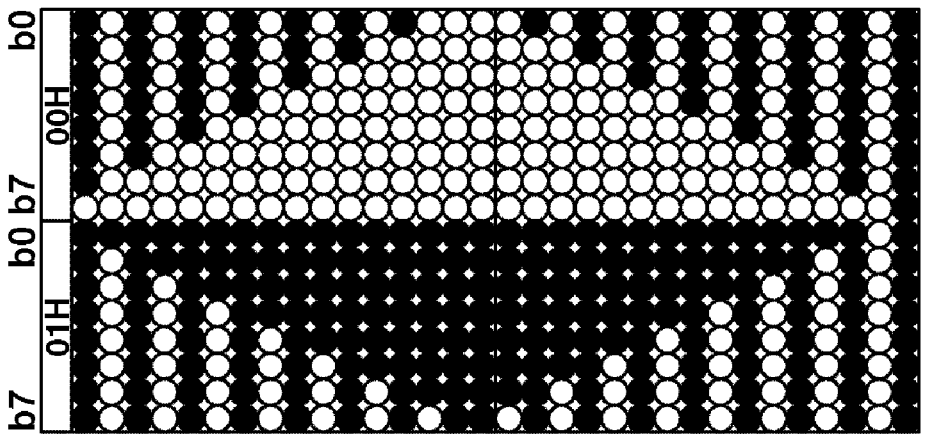
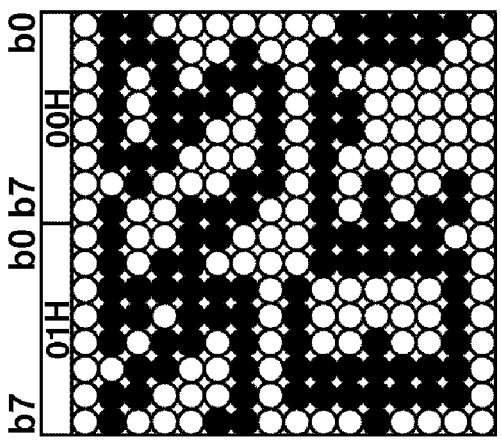

INFORMATION PROCESSING APPARATUS, SYSTEM AND METHOD FOR COMPRESSION OF IMAGE DATA

BACKGROUND OF THE INVENTION

1. Field of the Invention

The present invention relates to an information processing apparatus that can perform data compression and output compression data to an external device, and also relates to its driver software, a data transfer system, and an electronic apparatus.

2. Description of the Related Art

In general, inkjet printers have low noise and compact bodies, and require relatively low manufacturing and running costs. Accordingly, many inkjet printers are widely used as ordinary recording apparatuses or copying machines. Among conventional inkjet recording apparatuses, serial type inkjet recording apparatuses can perform recording on a recording medium with its recording head.

In particular, to reduce the capacity of a memory in a recording apparatus, a region of one scan recording operation can be divided into plural regions in the scanning direction. A host apparatus can transmit data and commands for each separate region to a recording apparatus. The recording apparatus can process the data and commands for each region received from the host apparatus and performs a recording operation with the recording head.

However, it is a recent trend that higher resolution images and higher quality images are demanded. Thus, the data volume transferred from a host apparatus to a recording apparatus tends to increase. The increase in the data transfer volume will cause a problem that a recording apparatus having a relatively low recording speed cannot follow the data transfer rate. The problem is not limited to only the data transfer performed between a host apparatus and a recording apparatus.

For example, recent image reading apparatuses have higher reading resolution and tend to be subjected to an increased volume of readout data. The volume of data transferred from an image reading apparatus to a host apparatus increases. Thus, reduction of a transfer time is required to ensure transfer of data from an image reading apparatus to a host apparatus.

Similarly, when a host apparatus transfers a large amount of data to other host apparatus, reducing a transfer time is desired. As described above, the volume of data transferred from one electronic apparatus to other electronic apparatus should be reduced and the transfer time should also be reduced.

SUMMARY OF THE INVENTION

The present invention is directed to reducing the data volume transferred from one electronic apparatus to other electronic apparatus, and to a reduction in the transfer time of this data.

At least one exemplary embodiment is directed to an information processing apparatus configured to perform compression of image data in units of n lines when each line is an integer multiple of m bits and output compression data to an electronic apparatus connected to the information processing apparatus. The information processing apparatus includes: a first compression unit configured to compress the image data in units of m bits with a predetermined pattern to produce first compression data; a second compression unit configured to compress the first compression data in units of k bits to produce second compression data; and an output unit configured to output the second compression data according to a production order of the second compression data produced from the second compression unit.

Furthermore, at least one exemplary embodiment is directed to a printer driver configured to perform compression of image data in units of n lines when each line is an integer multiple of m bits. The printer driver includes: a first compression step of compressing the image data in units of m bits with a predetermined pattern to produce first compression data; a second compression step of compressing the first compression data in units of k bits to produce second compression data; and an output step of outputting the second compression data according to a production order of the second compression data produced in the second compression step.

Furthermore, at least one exemplary embodiment is directed to an electronic apparatus configured to input compression data of image data compressed in units of n lines when each line is an integer multiple of m bits. The electronic apparatus includes: a first expansion unit configured to expand input data in units of k bits to obtain first expansion data; a second expansion unit configured to expand the first expansion data with a predetermined pattern to obtain second expansion data; a storage unit configured to store the second expansion data; and an output unit configured to output the second expansion data stored in the storage unit.

Furthermore, at least one exemplary embodiment is directed to a data transfer system including a first electronic apparatus and a second electronic apparatus, wherein the first electronic apparatus is configured to compress first data into second data in units of n lines when each line is an integer multiple of m bits, and the second electronic apparatus is configured to receive the second data transmitted from the first electronic apparatus and expand the second data into the first data. The first electronic apparatus includes: a first compression unit configured to compress the first data in units of m bits with predetermined data; a second compression unit configured to compress the data compressed by the first compression unit in units of k bits to produce the second data; and an output unit configured to output the second data to the second electronic apparatus according to a production order of the second data produced from the second compression unit. The second electronic apparatus includes: a first expansion unit configured to expand the second data; a second expansion unit configured to expand the data expanded by the first expansion unit in units of m bits with the predetermined data; and a storage unit configured to store the first data produced by the second expansion unit.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A through 3G are views showing compression of image data according to a first exemplary embodiment.

FIGS. 4A through 4C are views showing expansion of image data according to the first exemplary embodiment.

FIGS. 6A through 6F are views showing compression and expansion of image data according to a second exemplary embodiment.

DETAILED DESCRIPTION OF THE EMBODIMENTS

Figure 1:
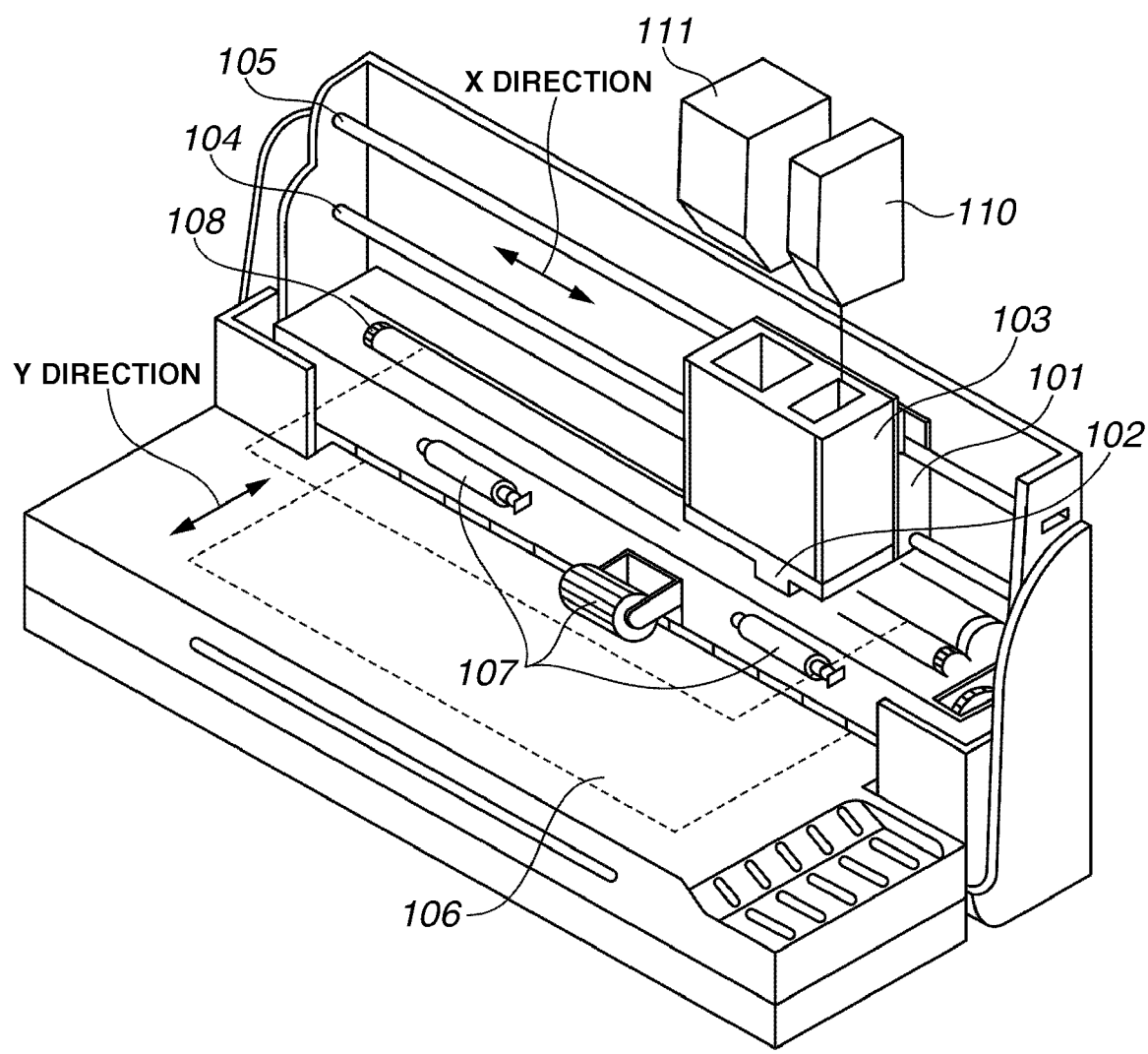
FIG. 1 is a perspective view showing an inkjet printer according to an exemplary embodiment.

The following description of exemplary embodiment (s) is/are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example, certain circuitry for signal processing, printing, etc. may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments of the present invention will be described below with reference to attached drawings. In the present exemplary embodiments, a first electronic apparatus can transfer image data to a second electronic apparatus. The first electronic apparatus has a memory including a region A, a region B, a region C, and a region D. The second electronic apparatus has a memory including a region E, a region F, a region G, and a region H.

First Exemplary Embodiment

The first electronic apparatus can be a host apparatus, and the second electronic apparatus can be a recording apparatus. The first electronic apparatus can transfer image data to the recording apparatus. The recording apparatus can perform image recording. The recording apparatus is, for example, a serial type printer (refer to FIG. 1) which can perform 2-pass recording according to which a recording head repeats a scanning operation twice to form an image at a predetermined region of a recording paper or other recording medium. In this case, the recording head performs scanning in the same direction (i.e., first direction). This scanning operation can be referred to as a unidirectional recording operation.

FIGS. 3A through 3G are views showing compression/expansion patterns and compressed/expanded recording data. In a data transfer system according to the present exemplary embodiment, the recording apparatus performs 2-pass image recording. The data transfer system processes recording data in units of a data block consisting of 32 nozzles in the vertical direction×16 columns in the lateral direction.

In another expression, a data volume of 32 rasters×16 columns constitutes the basic units (size) of recording data. In yet another expression, the basic units (size) can be a data volume consisting of 32 pixels in a nozzle array direction×16 pixels in the scanning direction of the recording head. In other words, the nozzle array direction is a conveyance direction of a recording medium. The compression/expansion patterns have the basic units (size) of 32 nozzles in the vertical direction×16 columns in the lateral direction.

FIG. 3A illustrates original image data that are not yet subjected to compression. FIG. 3A illustrates an exemplary allocation of addresses and an exemplary layout of bits corresponding to an image to be recorded on a recording medium, so that the contents of image data stored in a memory can be easily understood. In the present exemplary embodiment, the first electronic apparatus can produce image data of the basic units (or image data exceeding the basic units) beforehand.

When the recording apparatus performs a recording operation along the first direction, one pattern "D" is first read out and the other pattern "P" is next read out. In the recording operation, the recording apparatus first records the pattern "D", as indicated in the region of "00H" shown in FIG. 3A, and next records the pattern "P". In the processing of reading 16-bit data from a memory area of one address, the recording apparatus first processes 8 bits in the "00H" region and next processes 8 bits in a "01H" region.

The memory of the first electronic apparatus includes a plurality of memory areas allocated to addresses, starting from an address 1000H, in which image data can be successively stored. In the present exemplary embodiment, a region where image data can be stored is referred to as region A. Each memory area corresponding to one address can store image data of 16 bits. In other words, a memory area allocated an address can store 16 pixels.

In the drawings, black circles represent dots to be recorded and white circles represent dots to be unrecorded. Each black circle corresponds to data "1" and each white circle corresponds to data "0." In the drawings, the region A includes plural memory areas divided in the vertical direction to which addresses 1000H, 1002H, 1004H, - - - are allocated in this order from the head.

Compression Processing in First Pass

FIG. 3B illustrates a compression pattern for a first pass. The compression pattern can be successively stored in plural memory areas to which addresses 2000H onwards are allocated. FIG. 3B illustrates an exemplary allocation of addresses and an exemplary layout of bits corresponding to an image to be recorded on a recording medium, so that the contents of image data stored in a memory can be easily understood. A region where the compression pattern can be stored is referred to as region B. Each memory area allocated an address can store 16-bits data.

The first electronic apparatus can use the compression pattern of FIG. 3B to compress the image data shown in FIG. 3A. In FIG. 3B, white circles represent dots to be thinned out and black circles represent dots not to be thinned out. The total number of black circles is equal to the total number of white circles. In other words, using the compression pattern of FIG. 3B can reduce the data volume to half the size.

In a memory map shown in FIG. 3B, the region B includes plural divided memory areas to which addresses 2000H, 2002H, 2004H, etc. are allocated in this order from the head. FIG. 3C illustrates an exemplary process of compressing original recording data based on the compression pattern shown in FIG. 3B. To simplify description, this processing is hereinafter referred to as compression processing A. A region where the compression data can be stored is referred to as region C. For example, the compression data can be stored in memory areas to which addresses 3000H, 3002H, 3004H, etc. are allocated.

The first electronic apparatus can perform compression processing in the following manner. First, the first electronic apparatus can read part of the image data stored in a memory area corresponding to first address (i.e., 1000H) shown in FIG. 3A and part of the compression pattern stored in a memory area corresponding to first address (i.e., 2000H) shown in FIG. 3B. The first electronic apparatus can apply the compression processing A to readout image data of the above address with a readout compression pattern of the above address.

The first electronic apparatus can store compression result in terms of dots corresponding to black circles with respect to the readout image data of the above address.

The first electronic apparatus can repeat the above-described processing successively for partial image data and a partial compression pattern corresponding to succeeding addresses (1002H, 2002H; 1004H, 2004H; - - - ).

In the storage processing, the first electronic apparatus can shift the dots corresponding to black circles toward a lower-bit side. If there is any empty address in the head, the first electronic apparatus can shift the dots upward and can store the dots there.

In the examples shown in FIGS. 3A and 3B, the first electronic apparatus reads 16-bit image data out of a memory area of address 1000H. The readout image data has a value 0000H. The first electronic apparatus reads a 16-bit compression pattern out of a memory area of address 2000H. The readout data has a value 8000H. The first electronic apparatus applies AND processing to the readout data and pattern to obtain a result of 0000H.

In this case, the readout compression pattern includes only one black circle at the most significant bit (i.e., only one bit). As a result, the first electronic apparatus stores 0, as compression data, at b0 in a memory area of address 3000H (i.e., a position corresponding to bit 0).

Next, the first electronic apparatus reads 16-bit image data out of a memory area of address 1002H. The readout data is 7E7CH. The first electronic apparatus reads a 16-bit compression pattern out of a memory area of address 2002H. The readout data is FFFEH. Then, the first electronic apparatus applies AND processing to the readout data and pattern to obtain a result of 7E7CH. In this case, the compression pattern includes 15 black circles at all bits but the least significant bit.

The first electronic apparatus stores the 15-bit data at 15 bits starting from b1 in the memory area of address 3000H. While the first electronic apparatus repeats the compression processing A twice, the address 3000H can store 16-bit compression data.

More specifically, because b0 of address 3000H is already occupied with compression data in the previous storage processing, the first electronic apparatus stores the next compression result in the next memory area of address 3000H starting from b1.

Subsequently, to execute the next compression processing A, the first electronic apparatus reads 16-bit image data out of a memory area of address 1004H. The readout data is 7F7EH. The first electronic apparatus reads a 16-bit compression pattern out of a memory area of address 2004H. The readout data is C000H. Then, the first electronic apparatus applies AND processing to the readout data and pattern to obtain a result of 4000H.

The compression pattern includes black circles at the most significant and next bits (i.e., only two bits). As a result, the first electronic apparatus stores 1 at b0 and 0 at b1, as compression data, in a memory area of address 3002H.

As described above, the first electronic apparatus stores the data of a bit number resulting from the compression processing in units of one bit. FIG. 3B illustrates an exemplary layout of 1 bit, 15 bits, 2 bits, and 14 bits. Each arrow shown in FIG. 3C indicates the direction along which the data can be shifted.

FIGS. 3D and 3E show data storage conditions at the end of the compression processing A. Subsequently, the first electronic apparatus reads data out of the region C and performs data compression processing in units of 8 bits (hereinafter, refer to as compression processing B). In other words, the data units of the compression processing A can be twice the data units of the compression processing B. The compression processing B is, for example, a packbit type compression including addition of tag information. FIG. 3F illustrates data resulting from the packbit compression and stored in the region D.

More specifically, the first electronic apparatus performs the compression processing B in such a manner that, when reception data are successively subjected to expansion (extraction, decompression) processing, the head data (i.e., first 8-bit data) can be stored in a memory area of address 3000H, the next data (i.e., second 8-bit data) can be stored in a memory area of address 3001H, and the third 8-bit data can be stored in a memory area of address 3002H.

The first electronic apparatus stores compression data resulting from the compression processing B in the region D. Furthermore, the first electronic apparatus stores the data resulting from the above-described compression processing A in a predetermined order so as to correspond to the compression order in the later-performed compression processing B (i.e., the data transfer order).

After accomplishing the above-described consecutive compression processing, the first electronic apparatus can transfer a reduced amount of image data to the second electronic apparatus.

Expansion Processing in First Pass

The second electronic apparatus can perform expansion of input image data. As shown in FIG. 4A, the second electronic apparatus can store the input image data in the region E of its memory. Then, the second electronic apparatus can perform expansion processing B corresponding to the above-described compression processing B, and can store expansion data in the region F of its memory as shown in FIG. 4B.

Furthermore, the second electronic apparatus can store an expansion pattern for the expansion processing B in the memory region G. As shown in FIG. 4C, the expansion pattern has a data structure identical to that of the compression pattern. The first electronic apparatus can transfer the expansion pattern, and the second electronic apparatus can store the expansion pattern in the memory region G.

Then, the second electronic apparatus can perform expansion processing A corresponding to the compression processing A, which is applied to the data stored in its memory region F. The second electronic apparatus can store the data resulting from the expansion processing in the region H.

The data in the memory region F are successively stored according to the address order in the memory region A of the first electronic apparatus. As shown in FIG. 4B, the second electronic apparatus can store the data successively in memory areas of the region F to which addresses 6000H, etc., are allocated. The second electronic apparatus can store the expansion pattern successively in memory areas of the region G to which addresses 7000H, 7002H, 7004H, etc. are allocated.

In the expansion processing A, the second electronic apparatus reads part of the expansion pattern of one address and part of compressed image data of a corresponding address. The second electronic apparatus extracts data of a bit number corresponding to the total number of black circles in the readout expansion pattern, from a lower bit of the compressed image data.

Then, the second electronic apparatus successively stores the extracted data in bit positions of the black circles. The second electronic apparatus repeats the above-described processing.

More specifically, in the first expansion processing, the second electronic apparatus reads a partial expansion pattern out of a memory area of address 7000H. The readout data value is 8000H. Accordingly, a data number to be extracted from the compression data is 1.

Thus, the second electronic apparatus extracts (obtains) the data of 1 pixel from the compression data. The second electronic apparatus reads 16-bit image data of address 6000H (i.e., 16 pixels). The readout data is 7E7CH. The second electronic apparatus extracts 1 pixel positioned at the least significant bit of the readout data.

The extracted data is 0. The second electronic apparatus applies AND processing to the extracted data and the most significant bit data of the expansion pattern, and obtains a result of 0000H. The second electronic apparatus stores the resultant data, as expansion data, in a memory area of head address 8000H in the region H shown in FIG. 5A.

The memory area of address 8000H stores one white circle at the most significant bit, which is the data (pixel) extracted from the compression data. Neither white circles nor black circles are stored in the rest of the memory area of address 8000H. In the memory area of each address, any vacant area can be regarded as white circles (data is 0).

In the next expansion processing, the second electronic apparatus reads a partial expansion pattern from a memory area of address 7002H. The readout data is FFFEH. Accordingly, the data number to be extracted from the compression data is 15. In other words, the second electronic apparatus extracts (obtains) the data of 15 pixels from the compression data.

The second electronic apparatus extracts all of remaining 15-bit data of the image data 7E7CH read out in the previous processing. The extracted data is 7E7CH. The second electronic apparatus applies AND processing to the extracted data and the upper 15 bits of the expansion pattern, and obtains a result of 7E7CH.

The second electronic apparatus stores the resultant data, as expansion data, in a memory area of address 8002H in the region H. The memory area of address 8002H stores neither a white circle nor a black circle at the least significant bit 0, although this area can be regarded as a white circle (data is 0).

In this manner, the memory region H can store image data of a recording block, defined as basic units (size), consisting of 32 nozzles in the vertical direction×16 columns in the lateral direction. Similarly, the second electronic apparatus receives data of a succeeding recording block and starts a recording operation each time a predetermined amount of data has been received.

Compression Processing in Second Pass

Next, compression processing in a second pass will be described. The compression processing in the second pass is similar to the compression processing in the first pass, with the exception of the following points.

FIG. 3G illustrates a compression pattern for the second pass, which is complementary to the compression pattern shown in FIG. 3B. The compression pattern shown in FIG. 3G, having a pattern density of 50%, can be used to compress the data in the second pass. The compression method for the second pass is similar to the compression method for the first pass. Before performing a recording operation for the second pass, the compression data are transferred.

Expansion Processing in Second Pass

Next, expansion processing in the second pass is similar to the expansion processing in the first pass, with the exception of the following points.

FIG. 3G illustrates an expansion pattern for the second pass. As shown in FIG. 5B, the region H stores expansion data for the recording of the data in the second pass, which are successively stored in memory areas of addresses 8000H, 8002H, 8004H, etc.

Figure 5C:
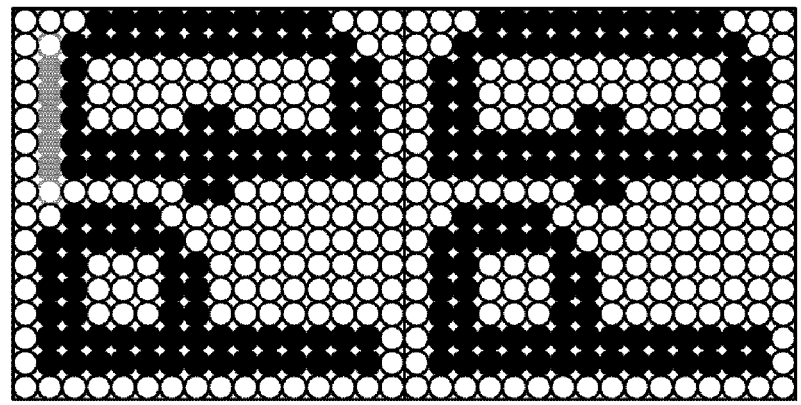
FIGS. 5A through 5C are views showing image data to be recorded according to the first exemplary embodiment.
Figure 5B:
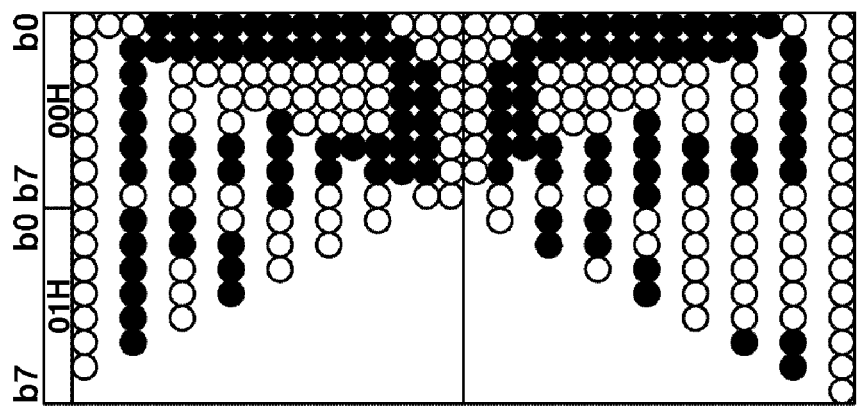
Figure 5A:
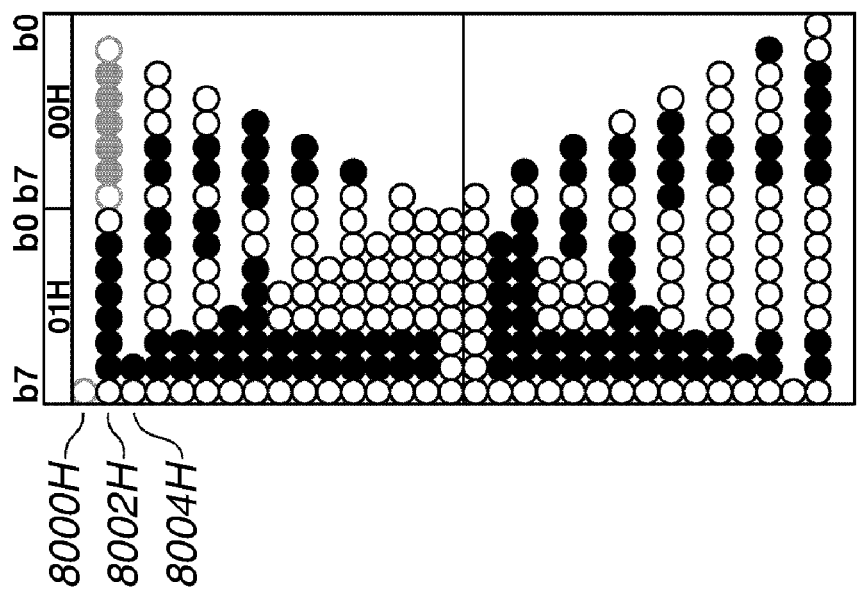

As described above, when a 2-pass recording operation is performed in one direction, an image corresponding to an image size of 32 rasters×16 columns (i.e., 32 nozzles×16 columns) can be formed on a recording medium as shown in FIG. 5C.

Compression Pattern/Expansion Pattern

In the exemplary embodiment, to perform expansion processing, the second electronic apparatus accesses the memory in units of 16 bits. Thus, the data resulting from the expansion processing should be prevented from being stored in memory areas of two addresses.

For example, the recording apparatus (i.e., the second electronic apparatus) includes the following logic circuit accessing the memory.

When the recording apparatus performs 2-pass recording, the total number of black circles (data is "1") contained in memory areas of two addresses (e.g., 7000H and 7002H) is always 16. If the two addresses are consecutive, the logic circuit can efficiently access the memory.

If one address consists of 17 bits, one bit will remain and must be stored in a memory area of the next address after accomplishing the expansion. As a result, the processing speed of the expansion processing will decrease. Accordingly, in a 2-pass recording mode, the logic circuit performing the expansion processing can access the memory in units of 32 bits.

The data transfer system, when it performs 3-pass recording, uses compression/expansion patterns different from those used in the 2-pass recording. Furthermore, in the 3-pass recording, the data transfer system accesses the patterns in data units different from that in the 2-pass recording. According to the patterns used in the 3-pass recording, the total number of black circles (data is "1") in memory areas of three addresses (e.g., 7000H, 7002H, and 7004H) is always 16 (including a case where data of 16 bits are "1"). The logic circuit, performing the expansion processing, accesses the memory in units of 48 bits.

Namely, when an n-pass recording operation is performed, the magnification in expansion is n (i.e., the magnification in compression is 1/n: n is an integer equal to or greater than 2). The total number of data in memory areas of n addresses should be equal to 16. In other words, 16 bits of effective data should be contained in the memory areas of n addresses.

The number 16 is equal to the memory access units (bit number) of the recording apparatus which performs the expansion processing A. The first electronic apparatus, such as an information processing apparatus, selects a compression table based on the value n, and the recording apparatus selects an expansion table based on the value n.

More specifically, with respect to the size of compression/expansion patterns, in the above-described exemplary embodiment, an image size of 32 rasters×16 columns constitutes the basic data units. When a memory area of each address is composed of 16 bits, the above basic data units include 32 addresses. Accordingly, n=2, 4, 8, and 16 are multi-pass numbers executable in recording operations of the recording apparatus.

In other words, the size (units) of compression data/expansion data is dependent on a recording mode (i.e., a pass number) of each recording apparatus. Namely, the raster number is equal to a least common multiple of a pass number of the multi-pass recording inherent to each recording apparatus (which performs a unidirectional scanning recording operation plural times at a predetermined region on a recording medium to form an image). As described above, the data volume transferred from one electronic apparatus to other electronic apparatus can be reduced. The data transfer can be efficiently carried out.

Recording Apparatus

FIG. 1 is a perspective view showing an inkjet printer as an exemplary electronic apparatus. The inkjet printer has the capability of performing both color and monochrome printing functions. The inkjet printer can receive data and commands from a personal computer or other host computer, and can perform printing on a recording paper or other recording medium.

As shown in FIG. 1, a carriage 101 mounts a multi-nozzle recording head 102 and a cartridge guide 103. The recording head 102 can discharge a black (K) ink with 320 nozzles and cyan (C), magenta (M), and yellow (Y) inks with 192 nozzles for each. The recording head 102 mounts a monochrome ink cartridge 110 storing the black ink and a color ink cartridge 111 storing the above color inks, so that black (K), cyan (C), magenta (M), and yellow (Y) inks can be respectively supplied from these cartridges. A flexible cable including numerous lead wires (not shown) can supply a drive signal to each nozzle of the recording head 102.

The carriage 101 is slidably supported on two guide rails 104 and 105. An endless belt (not shown) is connected to the carriage 101. When the endless belt is driven by a carrier motor (later described), the carriage 101 can travel in the X direction (hereinafter, the X direction is referred to as a main scanning direction). A conveyance roller 108, when driven by a conveyance motor (later described), can convey a recording paper 106 in the Y direction (hereinafter, the Y direction is referred to as a sub scanning direction).

Figure 2:
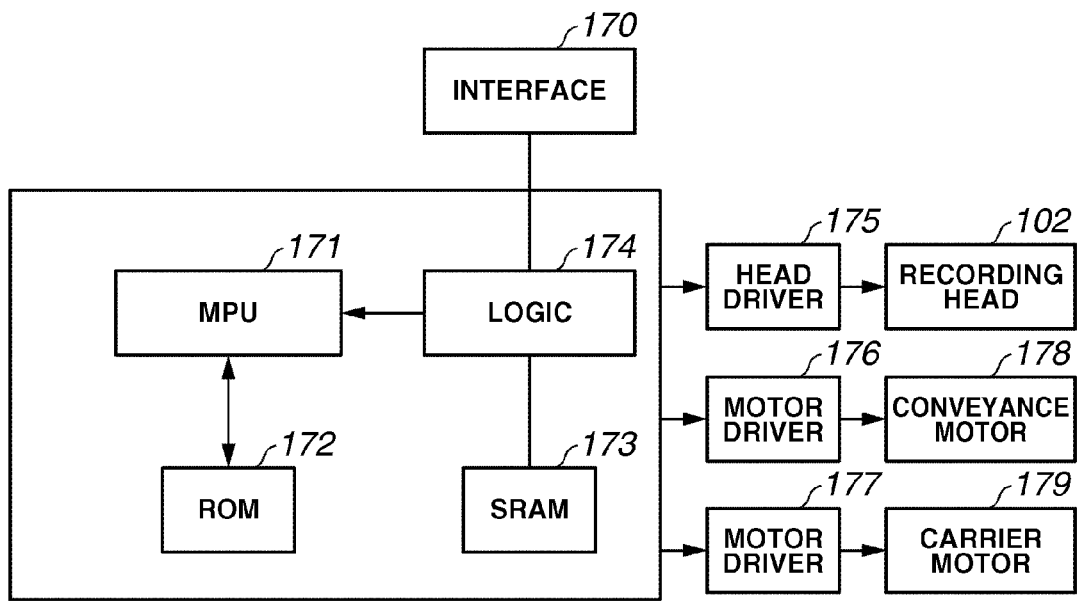
FIG. 2 is a block diagram showing an exemplary arrangement of a control circuit of the inkjet printer.

FIG. 2 is a block diagram showing an exemplary control circuit for the inkjet printer. In the control circuit shown in FIG. 2, an interface 170 can input a recording signal from a host computer or other external apparatus. An MPU 171 can execute various control programs. A ROM 172 can store the control programs (including letter fonts, if necessary).

An SRAM 173 (or SDRAM, or DRAM) can temporarily store various data (including expansion patterns, and data received from the host apparatus). A LOGIC section (ASIC) 174 can control recording performed by the recording head 102, and execute the above-described expansion processing, and HV conversion processing. Furthermore, the LOGIC section 174 can control data transfer among the interface 170, the MPU 171, and the RAM 173.

A carrier motor 179 can shift the recording head 102 in the main scanning direction. A conveyance motor 178 can convey a recording paper. A head driver 175 can drive the recording head 102. A motor driver 176 can drive the conveyance motor 178. Another motor driver 177 can drive the carrier motor 179.

The above-described control circuit can perform the following operations.

When the interface 170 receives a command and data, the LOGIC 174 and the MPU 171 convert the input data into recording data to be printed. The motor drivers 176 and 177 drive the motors 178 and 179, while the head driver 175 drives the recording head 102 based on the received recording data. As a result, an image can be printed on the recording paper 106.

Host Apparatus

Figure 8:
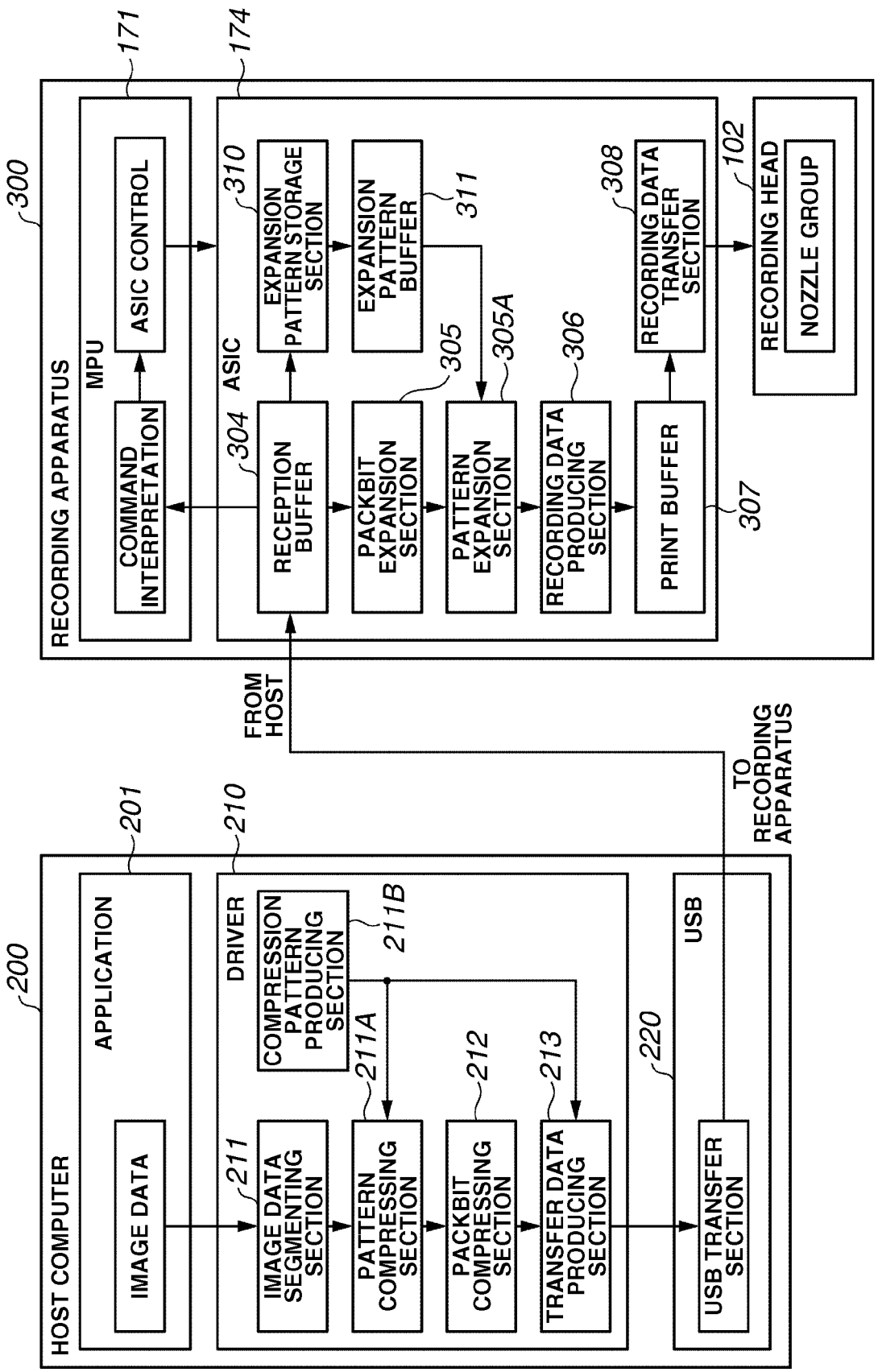
FIG. 8 is a block diagram showing a printing system including a host apparatus and a recording apparatus according to an exemplary embodiment.

FIG. 8 is a block diagram showing an exemplary printing system (i.e., a data transfer system) including a host computer and a recording apparatus. In the exemplary embodiment shown in FIG. 8, the above-described first electronic apparatus is a host computer 200 and the second electronic apparatus is a recording apparatus 300.

The host computer 200 includes an application 201, a driver 210, and a USB section 220. The application 201 can produce image data. The driver 210 can produce transfer data based on the image data produced from the application 201. The USB section 220 can transfer the transfer data to the recording apparatus 300.

The driver 210 includes an image data segmenting section (i.e., an image data extracting section, an image data clipping section) 211, a pattern compressing section 211A, a compression pattern producing section 211B, a packbit compressing section 212, and a transfer data producing section 213.

The image data segmenting section 211 can obtain (or segment) a predetermined amount of data from the image data produced from the application 201. For example, FIG. 3A illustrates an example of segmented data. The pattern compressing section 211A can compress the segmented data obtained from the image data segmenting section 211, based on a compression pattern (i.e., compression information, for example shown in FIG. 3B) that the compression pattern producing section 211B can produce. FIG. 3D illustrates exemplary compression data. The packbit compressing section 212 can further compress the compression data received from the pattern compressing section 211A. FIG. 3F illustrates an example of packbit compression data.

The transfer data producing section 213 can produce transfer data based on the packbit compression data. The USB section 220 can receive the transfer data from the transfer data producing section 213 and can output the transfer data via a USB interface to the recording apparatus 300. The compression pattern producing section 211B can also send the compression pattern to the transfer data producing section 213.

In this manner, through 2-stage compression processing (i.e., the pattern compression and the packbit compression), the host computer 200 can reduce a data volume transferred to the recording apparatus 300.

The recording apparatus 300 includes a reception buffer 304 of ASIC 174 that can store the packbit compression data received via the interface from the host 200. In addition to the reception buffer 304, the ASIC 174 includes a packbit expansion section 305, a pattern expansion section 305A, a recording data producing section 306, a print buffer 307, a recording data transfer section 308, an expansion pattern storage section 310, and an expansion pattern buffer 311.

The packbit expansion section 305 can expand the packbit compression data stored in the reception buffer 304. The pattern expansion section 305A can further expand the compression data expanded in the packbit expansion section 305 based on an expansion pattern. The recording data producing section 306 can produce recording data from the expansion data. The print buffer 307 can store the recording data produced from the recording data producing section 306. The recording data transfer section 308 can read the recording data from the print buffer 307 and transfer the readout recording data to the recording head 102.

The expansion pattern storage section 310 can read, from the reception buffer 304, the expansion pattern transmitted from the host computer 200. The expansion pattern buffer 311 can store the readout expansion pattern, so that the pattern expansion section 305A can read the expansion pattern from the expansion pattern buffer 311.

Second Exemplary Embodiment

The recording apparatus described in the first exemplary embodiment performs a unidirectional 2-pass recording operation, according to which the recording head performs scanning in the same direction.

On the other hand, a recording apparatus of the second exemplary embodiment can perform a bidirectional or reciprocating 2-pass recording operation, according to which the recording head performs scanning in both a first direction and a second direction opposed to the first direction.

Figure 6C:
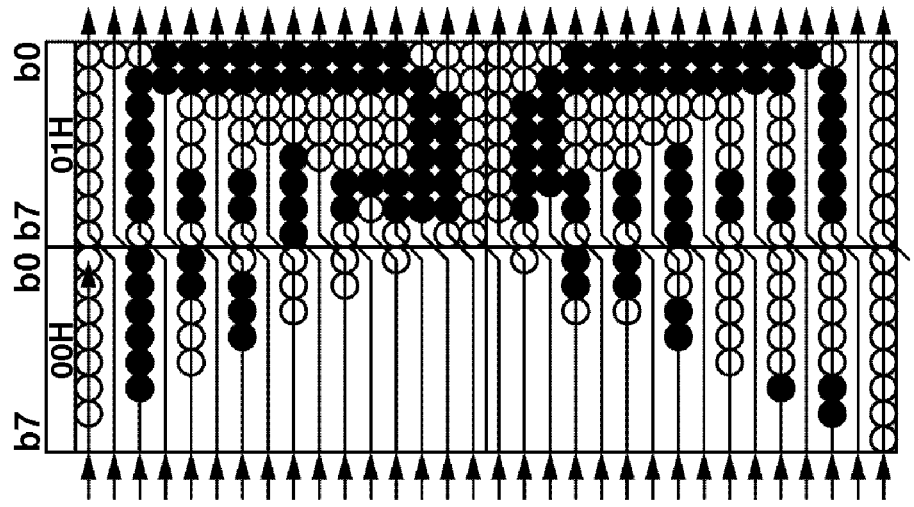
Figure 6B:
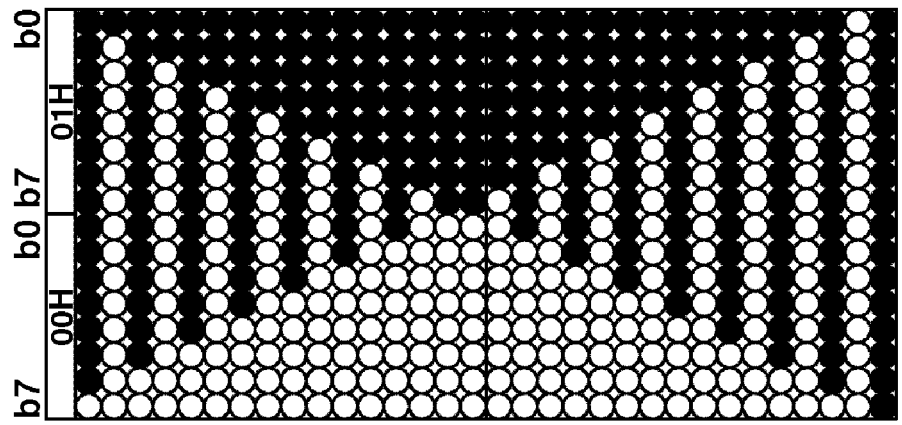
Figure 6A:
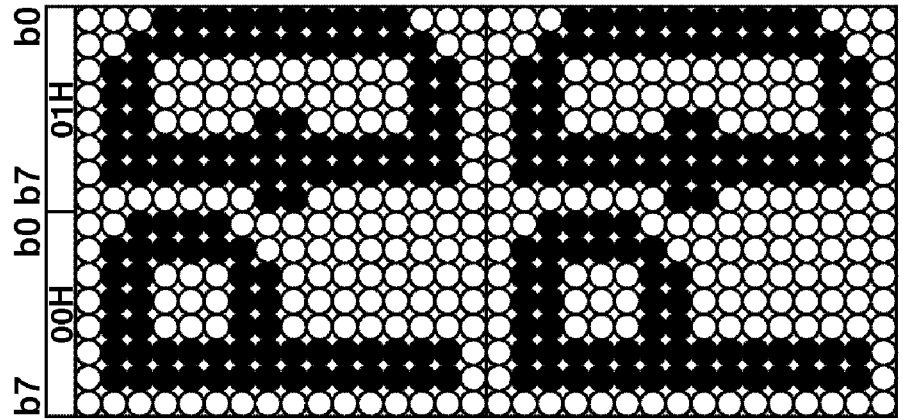

FIG. 6A illustrates exemplary image data (i.e., original recording data) to be read in the second direction. Because the second direction is opposite to the first direction, the processing order of image data in the second direction is opposite to that in the first direction. When the recording apparatus performs a recording operation along the second direction, one pattern "P" is first read out and the other pattern "D" is next read out. FIG. 6B illustrates a compression pattern corresponding to the second direction.

FIG. 6C illustrates a process of compressing the original recording data shown in FIG. 6A based on the compression pattern shown in FIG. 6B. Similar to the processing described in the first exemplary embodiment, the compression process of the second exemplary embodiment includes reading image data from a memory area of one address, reading a compression pattern from a memory area of a corresponding address, and storing compression data from a lower bit side.

If there is any empty space in a memory area of a head address, the stored compression data can be shifted toward the head. Unlike the illustration of FIG. 3C, each 16-bit space consists of upper 8 bits and lower 8 bits which are reversed in a positional relationship (i.e., differentiated in the mapping of byte units).

FIG. 6D illustrates a data storage condition at the end of the compression processing A. These data are further subjected to the compression processing B and are sent to the recording apparatus. FIG. 6E illustrates an expansion pattern. FIG. 6F illustrates a data storage condition at the end of expansion processing.

Figure 7C:
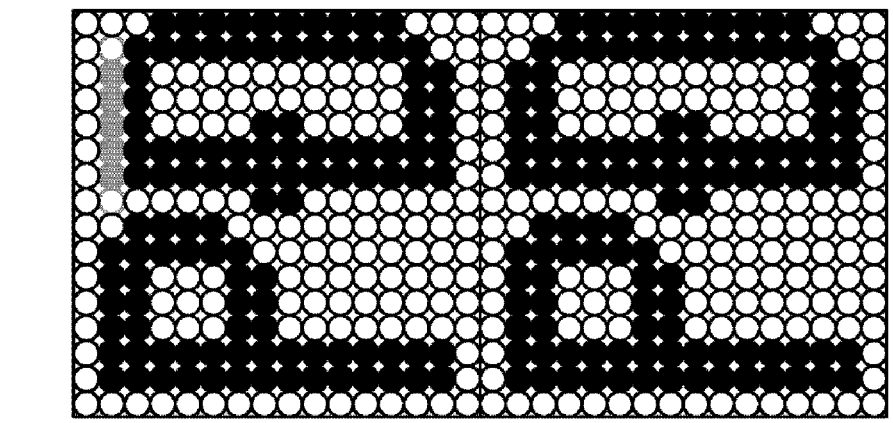
FIGS. 7A through 7C are views showing image data to be recorded according the second exemplary embodiment.
Figure 7B:
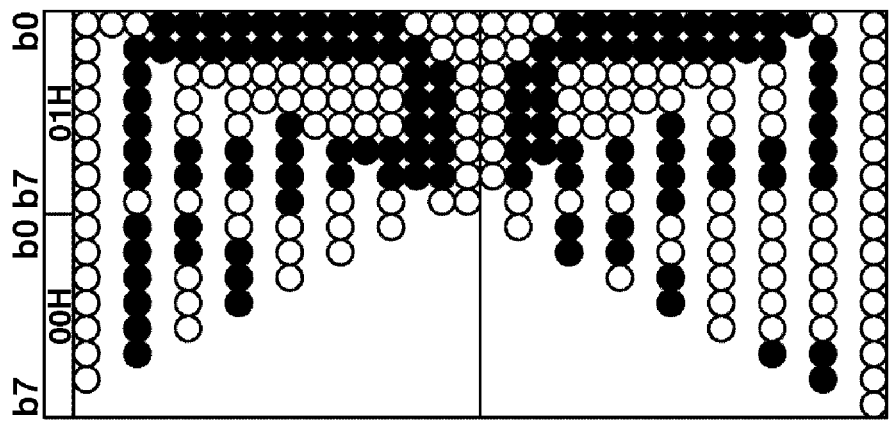
Figure 7A:
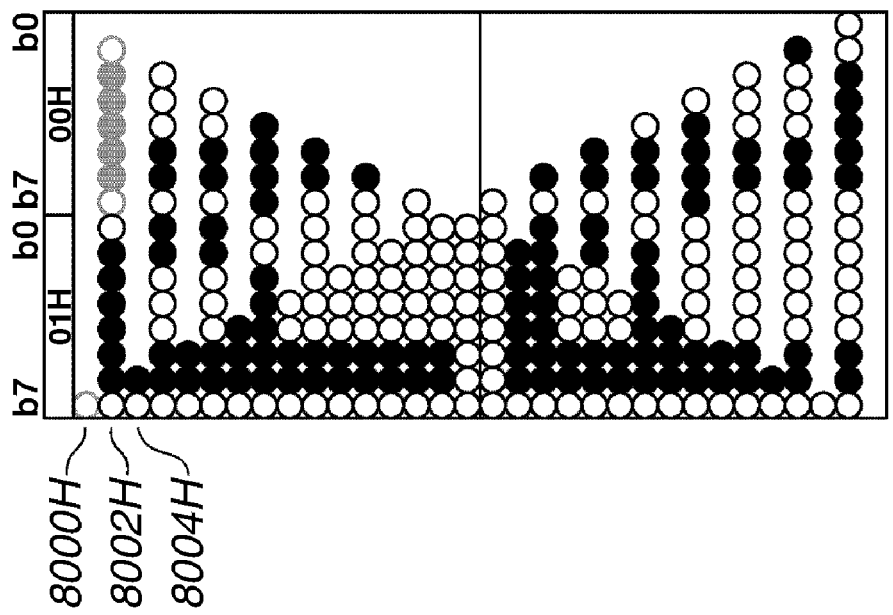

FIGS. 7A through 7C illustrate a bidirectional recording operation. FIG. 7A illustrates expansion data for the recording of a first pass. FIG. 7B illustrates expansion data for the recording of a second pass. The expansion data shown in FIG. 7B can be obtained by switching the upper 8 bits and the lower 8 bits in the mapping shown in FIG. 6F.

FIG. 7C illustrates an image corresponding to an image size of 32 rasters×16 columns (i.e., 32 nozzles×16 columns) formed on a recording medium. As described above, the data volume transferred from one electronic apparatus to other electronic apparatus can be reduced. The data transfer can be efficiently carried out.

Other Exemplary Embodiment

With the arrangement described in the first exemplary embodiment or in the second exemplary embodiment, the data volume transferred from a host apparatus to a recording apparatus can be greatly reduced. For example, it is now supposed that a printing apparatus performs 2-pass recording, with the resolution of 192 nozzles in the vertical direction and 4800 dpi in the lateral direction, and a data amount transferred at a time is 8 inches in the scanning direction. In this case, a conventional method will require 192×4800×8=9216000 [byte] for transferring the data. However, according to the above-described exemplary embodiments of the present invention, the data amount can be decreased to a half level.

In the above-described exemplary embodiments, image data of each recording block has the basic units (size) of 32 nozzles in the vertical direction×16 columns in the lateral direction. However, the basic units of a recording block can be changed. For example, the size of a recording block can be 64 nozzles in the vertical direction×32 columns in the lateral direction.

Furthermore, the above-described exemplary embodiments do not intend to limit the data units for the compression processing/expansion processing to be 16 bits. Therefore, the data units for the compression processing/expansion processing can be 32 bits or 64 bits. Furthermore, the above-described exemplary embodiments do not intend to limit the data units in the above-described compression processing A to be twice the data units in the compression processing B. Therefore, the data units in the compression processing A can be 4 times or 8 times the data units in the compression processing B.

In the relationship between the first electronic apparatus and the second electronic apparatus, the above-described exemplary embodiments do not intend to limit the first electronic apparatus to a host apparatus which transfers data to the second electronic apparatus and also do not intend to limit the second electronic apparatus to a recording apparatus. Therefore, the first electronic apparatus can be an image input unit (e.g., a scanner), and the second electronic apparatus can be a host apparatus.

The above exemplary embodiments can be preferably applied to ordinary printing apparatuses of an inkjet recording type, which are equipped with a thermal energy generation unit (e.g., an electrothermal energy conversion member, a laser beam, or the like) to perform ink discharge by controlling the thermal energy that causes conditional changes in the ink. The printing apparatuses according to the present invention can realize high-density and high-definition recording.

Furthermore, a recording apparatus according to the present invention is not limited to a printer integrally or separately provided as an image output terminal for a computer or other information processing apparatus, and therefore can be a copying apparatus combined with a reader or a facsimile apparatus having transmission/reception functions.

Moreover, the present invention can be applied to a system including plural devices or to a single apparatus. Furthermore, the present invention can be realized by supplying a program to a system or an apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application Nos. 2005-159122 filed May 31, 2005, and 2006-120803, filed Apr. 25, 2006 which are hereby incorporated by reference herein in their entirety.

What is claimed is:

1. An information processing apparatus configured to perform compression of image data in units of n lines when each line is an integer multiple of m bits and output compression data to an electronic apparatus connected to the information processing apparatus, comprising:

a first compression unit configured to compress the image data in units of m bits with a predetermined pattern to produce first compression data;

a second compression unit configured to compress the first compression data in units of k bits to produce second compression data; and an output unit configured to output the second compression data according to a production order of the second compression data produced from the second compression unit, and configured to output the predetermined pattern used to produce the first compression data.

2. The information processing apparatus according to claim 1, wherein the second compression unit performs a packbit compression.

3. A method of compressing image data in units of n lines, each line being an integer multiple of m bits, comprising:

using a processor to perform the sterns of:

a first compression step of compressing the image data in units of m bits with a predetermined pattern to produce first compression data;

a second compression step of compressing the first compression data in units of k bits to produce second compression data; and an output step of outputting the second compression data according to a production order of the second compression data produced in the second compression step, and outputting the predetermined pattern used to produce the first compression data in the first compression step.

4. The method according to claim 3, wherein a packbit compression is performed by the second compression step.

5. An electronic apparatus configured to input compression data of image data compressed in units of n lines when each line is an integer multiple of m bits, comprising:

a receiving unit configured to receive the compression data and a predetermined pattern used to produce the compression data:

a first expansion unit configured to expand input data in units of k bits to obtain first expansion data;

a second expansion unit configured to expand the first expansion data with the predetermined pattern to obtain second expansion data;

a storage unit configured to store the second expansion data; and an output unit configured to output the second expansion data stored in the storage unit.

6. The electronic apparatus according to claim 5, wherein the second expansion unit accesses the predetermined pattern based on an operation mode of the electronic apparatus.

7. The electronic apparatus according to claim 5, wherein the electronic apparatus is a serial type recording apparatus that performs multi-pass recording, and accesses the predetermined pattern based on a pass number of the multi-pass recording.

8. A data transfer system including a first electronic apparatus and a second electronic apparatus, wherein the first electronic apparatus is configured to compress first data into second data in units of n lines when each line is an integer multiple of m bits, and the second electronic apparatus is configured to receive the second data transmitted from the first electronic apparatus and expand the second data into the first data, wherein the first electronic apparatus comprises:

a first compression unit configured to compress the first data in units of m bits with a predetermined pattern to produce compressed data;

a second compression unit configured to compress the data compressed by the first compression unit in units of k bits to produce the second data; and an output unit configured to output the second data to the second electronic apparatus according to a production order of the second data produced from the second compression unit, and configured to output the predetermined pattern used to compress the data compressed by the first compression unit, the second electronic apparatus comprises:

a receiving unit configured to receive the second data and the predetermined pattern;

a first expansion unit configured to expand the second data;

a second expansion unit configured to expand the data expanded by the first expansion unit in units of m bits with the predetermined pattern; and a storage unit configured to store the first data produced by the second expansion unit.

9. A computer readable medium having a printer driver software application stored thereon for compressing image data in units of n lines, each line being an integer multiple of m bits, which when loaded into a computer and executed performs the following method, comprising:

a first compression step of compressing the image data in units of m bits with a predetermined pattern to produce first compression data;

a second compression step of compressing the first compression data in units of k bits to produce second compression data; and an output step of outputting the second compression data according to a production order of the second compression data produced in the second compression step, and outputting the predetermined pattern used to produce the first compression data in the first compression step.

* * * * *